United States Patent
Vaughn, Jr.

(10) Patent No.: US 7,427,954 B2
(45) Date of Patent: Sep. 23, 2008

(54) METHOD AND APPARATUS FOR DIRECTION FINDING

(75) Inventor: David A. Vaughn, Jr., Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 415 days.

(21) Appl. No.: 11/120,940

(22) Filed: May 3, 2005

(65) Prior Publication Data

US 2006/0227050 A1    Oct. 12, 2006

Related U.S. Application Data

(60) Provisional application No. 60/669,148, filed on Apr. 7, 2005.

(51) Int. Cl.
*G01S 5/04* (2006.01)
(52) U.S. Cl. ..................................................... 342/444
(58) Field of Classification Search ................. 342/444, 342/140, 445
See application file for complete search history.

(56) References Cited

U.S. PATENT DOCUMENTS

| 4,333,170 | A | * | 6/1982 | Mathews et al. ............ 367/125 |
| 4,639,733 | A | * | 1/1987 | King et al. .................. 342/424 |
| 6,765,532 | B2 | * | 7/2004 | Vaccaro et al. .............. 342/445 |

* cited by examiner

*Primary Examiner*—Thomas H. Tarcza
*Assistant Examiner*—Fred H. Mull
(74) *Attorney, Agent, or Firm*—Robert K. Tendler; Daniel J. Long

(57) ABSTRACT

A direction finding system is used in which a number of adjacent bands are sequentially measured in fast rotation, with the results from each of the bands being FFT processed to provide amplitude and phase information on all of the signals existing within the band. Upon ascertaining that one wishes to do a direction finding process, one merely accesses the information in the delay memory so that direction finding resources are only allocated to signals of interest and such that one does not have to re-do an FFT upon finding a signal of interest.

22 Claims, 4 Drawing Sheets

METHOD AND APPARATUS FOR DIRECTION FINDING

RELATED APPLICATIONS

This Application claims rights under 35 USC § 119(e) from U.S. Application Ser. No. 60/669,148 filed Apr. 7, 2005, the contents of which are incorporated herein by reference.

FIELD OF THE INVENTION

This invention relates to direction finding and more particularly to a broadband scanning direction finding system capable of simultaneous direction-finding on large numbers of emitters.

BACKGROUND OF THE INVENTION

It has always been a priority for signal intelligence to be able to detect the presence of new energy from emitters and to obtain not only the azimuth in terms of the line of bearing (LOB) to the emitter but also elevation of the incoming signal so as to be able to locate the emitter.

In so doing, one can ascertain the position of the emitter and its distance from the detector array, thereby to permit deploying countermeasures.

In the past, namely in the 1960s and '70s, the requirement was to be able to detect and classify as many as 10 new energy sources per second. However, with the proliferation of emitters, it has now become a requirement to be able to detect and direction-find on as many as 1,000 emitters per second. This has proved to be a troublesome requirement, especially with prior architectures. These legacy systems would first have to ascertain whether there was a signal worth direction finding on. This was accomplished by providing a new energy alarm (NEA) that alerted the direction finding system of the existence and frequency of an emitter that had popped up. The DF processing then worked through the detected new energy sources as fast as it could.

However, there was no indication prior to instigating the direction finding process which signals were important to direction-find on. The prior systems therefore had to simply jump in and try to direction-find based on whatever order the new energy emitters came in, with no prioritization.

Moreover, a more important problem was that the emitters could come on briefly and then disappear. As will be appreciated, in prior DF systems it was not possible to direction-find on a signal that had disappeared. It was therefore necessary to immediately perform direction-finding on any and all new energy, without knowing whether the emission was important or not.

Moreover, the prior DF systems were based on narrow band receivers, which never were able to keep up with all of the new energy alarms that were coming in. With the present proliferation of emitters, the older narrow bandwidth systems are not able to keep up with even a significant percentage of the load.

The only way that one could potentially have accommodated all of the new sources would be to duplicate the direction finding systems. Thus, if one had 100 complete direction finding systems that could perform 10 direction finding operations per second, one would be able to accommodate the requirement of direction finding on 1,000 emitters per second. However, by merely duplicating the number of full-up direction finding systems, one would have the complication of coordinating between the direction finders. Moreover, aside from the coordination problem, one would require extra sets of hardware, involving more power, more heat, more cooling, increased weight, increased physical size, and increased cost.

Moreover, one would have to use the same coherent antenna array. However, if one divides the available power at the antenna elements between all of the direction finding systems, one loses power per channel. This means that the ability to direction-find on a low-level signal, which is always a problem, gets even more exacerbated.

Thus, there did not appear to be a solution to the requirement of being able to direction-find on two orders of magnitude more signals using the prior narrow band directed DFing systems.

By way of background, the narrow band systems employ a number of narrow band receivers, which for HF requires 3 to 6 KHz of bandwidth. For VHF/UHF, bandwidth is on the order of 25 to 100 KHz.

In order to be able to tune through the various bandwidths, one had to have very fast-tuned receivers. In order to capture all sources that pop up, one would then have to quickly tune the whole array's worth of receivers to whatever emitter was providing the new energy alarm (NEA).

For instance, in HF, if the new source was determined to be at 1 MHz, all of the narrow band receivers would have to be tuned to 1 MHz. For a 16-element array this meant that all 16 receivers would have to be tuned to 1 MHz. Thereafter, data was collected for some period of time, whereupon the next new source, which could conceivably be at 2 MHz, would require tuning the entire array of receivers to another frequency, for instance 2 MHz, before performing a direction finding on the identified signal. Because new energy sources appear at a very fast rate, the receivers would be constantly tuning to some frequency, meaning that the receivers would be tuning all over the place. Moreover, the prior narrow band finding scheme could only service the new energy sources as they came in and direction-find on them as best as they could. This was done without identifying whether they were a threat or of interest.

Thus there was no mechanism to select amongst those signals that triggered a new energy alarm. The result was that the direction finding system merely took the next new source in the queue and processed it.

While it was possible for an operator to exclude certain frequency ranges to focus the direction finding process, by so doing the operator would be simply throwing out processing in the excluded range thereby allowing the direction finding system to process signals in other frequency ranges. Thus, once the decision was made to exclude a band, there was no way of using the results from the processing of other bands to obtain results for the excluded band.

In operation, the narrow band systems coherently sample the antenna array so that in addition to obtaining a line of bearing or azimuth, the elevation (or depression) of the signal can be calculated allowing the system to accurately process sky waves. Not only did one wish to ascertain the angle at which the signal came in, the elevation angle would provide some indication of range to the emitter.

In one embodiment of the narrow band systems, the array was coherently sampled for a 16-element array, and 16 receivers were provided. All of these receivers would feed their own analog-to-digital converters. The analog-to-digital converters would then have their outputs processed by a Fast Fourier Transform (FFT), so that the time domain information would be converted to frequency domain information. The result was amplitude and phase information that was correlated against an existing direction finding database, sometimes called a manifold, to compute angle of arrival and elevation.

It will be appreciated that after a new energy alarm one had to tune each receiver, one receiver per antenna element, and to perform an FFT on the output of each antenna element's receiver to provide for the frequency domain values used by conventional direction finding techniques. Thus the FFT was done only after a signal was detected as being up. This was done seriatum, one signal source at a time, and required that the signal be up when performing the direction finding function.

In the narrow band receivers one of course did not have to pick up the entire bandwidth of the signal. Depending on the modulation type, if amplitude modulated, one would not want to look at the entire 25 KHz bandwidth. The prior systems thus picked out a very small slice, perhaps 100 Hz or down to 10 Hz, depending on how important the signal was, in order to be able to pull out the line of bearing from the amplitude and phase value of the one bin that was available.

Note that the narrow band systems did not wish to listen to the entire signal, especially, for instance, an FM stereo station that is 200 KHz wide, but rather wished only to focus on finding the direction of arrival. In so doing, one could pick out just 25 KHz and do a direction finding operation on just that slice of energy.

In summary, upon ascertaining of a new source, one performed a direction finding process on the frequency of interest, after which the system would then go and service the next new source. The result of the use of narrow band assets was that a tremendous amount of tuning was involved, with signals popping up all over the place such that one would never know if one was going to be able to service all of the new sources.

Thus the narrow band systems first had to ascertain that new energy was coming in and then quickly tune the receivers so as to be able to obtain the amplitude and phase information after having processed the signals by a Fast Fourier Transform.

With respect to the deficiencies in the prior art narrow band systems, the major deficiency was the inability to keep up with all of the new energy alarms. For instance, it is not the fact that all 10 signals might be above the signal-to-noise ratio that one is concerned with; it is that there are other signals that are below it. Thus, if the requirement was to process 10 new energy alarms per second, if the signal-to-noise ratio for new sources was low, one might only be able to measure 5 sources per second. As a result, the prior narrow band systems designed to track 10 sources per second might not be able to do so for weak signals.

Secondly, one of the problems with the above narrow band systems was that one did not know the priority of the signal being processed. Thus the direction finding system could be measuring and computing the angle of arrival for a signal of low priority while a high priority signal went un-serviced.

The net result of the prior systems was that they missed processing emitters that had been previously identified as being above a certain alarm threshold. Moreover, many emitters dropped out before they could be processed. The problem was so severe that with proliferating emitters, one would be lucky to obtain direction finding results for 10% of the signals.

SUMMARY OF INVENTION

Rather than basing the direction finding on the popping up of a signal that creates a new energy alarm, in the subject system one methodically scans through the entire spectrum, grabs a chunk of data for some amount of time and performs a Fourier Transform on it, after which the result is placed in a delay memory. The final direction finding computation is not performed in this measurement portion of the system because one does not have to perform direction finding on all of the data until one is convinced that one needs to.

It is a key feature of the subject invention that the system separates the measurement of signal data from the direction finding calculation by storing all measured data until a determination is made on which data is to be processed with direction finding algorithms. Because all of the measured data is stored, one is able to direction-find on all emitters of interest whether or not they are continuing to transmit and whether or not they are masked by stronger stations.

What this means is that whether the direction finding is triggered by a new energy alarm, or whether one needs to count the number of signals of interest, or whether one wants to detect signals hiding behind other signals, all of the information to do so is resident in the delay memory.

The system collects samples in a predetermined band during a predetermined time interval in the scan plan and performs a large Fast Fourier Transform so as to obtain the amplitude and phase for a large number of bins in the band. The larger the number of FFT points, the more signals are detected because the narrower are the bins. The results of each bin are then stored in the delay memory.

In one embodiment, when new energy is detected, the system goes back and extracts from the delay memory the amplitude and phase for the frequency of interest to permit direction finding only at the frequency at which a new source is detected. Alternatively, a new energy alarm is not required if one wants to examine all of the results of the scan.

The follow-on direction finding calculation processes are totally independent of the measuring process such that the measuring system can sweep an entire band, store the results, and then perform the direction finding calculation using only the results stored in delay memory that correspond to an event of interest.

No longer is the system constrained to trying to tune receivers while the energy is still on the air. The only requirement of the subject bifurcated system is that one do a wideband scan fast enough to capture even momentary sources and then be able to read out and process the delay memory and obtain the alarm fast enough to compute the line of bearing (LOB) within a short period after the new energy alarm has occurred.

No longer does one perform a direction finding computation on all signals. One simply needs to provide fast-tuning sub-millisecond receivers that, for instance, can be tuned in a couple of hundred microseconds.

One of course needs to consider collection time. The collection time refers to how fine a bin size one wants, with the smaller the bin size, the longer the dwell or integration time. What making the bin size smaller does is to allow one to integrate over a longer period of time, thus to increase the signal that one is interested in with respect to background noise.

The key parameter in the subject system is the duration of the shortest signal of interest. Taking, for example, and assuming that each one of the 100 signals is expected to be up for 1 second, one would have to direction-find on 100 signals in 1 second. The question then becomes how much above the noise floor the particular signal must be. If the signal is 50 dB above the noise floor, one can sample for a very short period of time and get a very accurate direction finding result, thus to meet the requirement for 100 signals per second. Conversely, if the signal is very little above the noise floor, one may have to sample for a very long period of time in order to achieve the appropriate signal-to-noise ratio.

While the integration time was chosen in the past by the operator, the integration time is now part of the scan plan.

In order to be able to process the proliferating signal sources, the problem is solved in the subject invention by separating the measurement from the direction finding calculation. The measurement is made in the time domain and one does a time-domain-to-frequency-domain conversion using an FFT prior to any direction finding calculation. One then stores the data from the FFT in delayed memory.

Note that one advantage over the narrow band systems, which achieve a narrow band channel out of a wide front end by digitally down-converting, is that it avoids the mathematics used in digital down-conversion. Since direction finding does not require an analog-type narrow band channel, if one can obtain enough data, namely a long enough sample to obtain the required signal-to-noise level, one can do a DF process without the computational overhead required in digital down-conversion. The subject system solves the problem of processing enough data by using a very large FFT. The results of the very large FFT are stored in delay memory, where one can then come along later, pull out the required values and immediately perform a direction finding process in an exceptionally short period of time. Thus one does not need to do an FFT again after having ascertained that there was a signal of interest, since it was done ahead of time.

As a result of initially using a very large FFT and being able to extract the data out of memory, one has simplified the process so that one is able to calculate as many as 1,000 DFs per second.

Thus, in the prior narrow band systems one used directed direction finding that required massive amounts of quick tuning to make sure that the signal was still on the air. The subject system does not require that the signal be up when the direction finding calculation is completed, but merely that it be up momentarily during a particular scan. Moreover, the subject system is not bogged down by narrowband digital down-conversion or subsequent sequential FFTs.

Note that if one wanted to take the narrow band DF system and scan it by duplicating the hardware, the scanning would take on the order of seconds, if not minutes. It would depend on how fast one could switch and how long one would want the integration time. As will be appreciated, most signals are not up for seconds to minutes so that there would be no way to sweep and get back in time to obtain results for all of the new energy sources.

In the subject system, at least for HF, one might use a 5 MHz wide RF pre-selector to provide out of band signal rejection and bin sizes of several 100s of hertz, which means in less than ten milliseconds or so the band is appropriately sampled. Thus the system can revisit a particular frequency multiple times per second.

Thus, in addition to allowing direction finding on every signal, the subject system allows one to obtain multiple cuts on every signal. This in turn is used to refine the line of bearing accuracy.

In summary, a direction finding system is used in which a number of adjacent bands are sequentially measured in fast rotation, with the results from each of the bands being FFT processed to provide amplitude and phase information on all of the signals existing within the band. Upon ascertaining that one wishes to do a direction finding calculation process, one merely accesses the information in the delay memory so that direction finding resources are only allocated to signals of interest and such that one does not have to re-do an FFT upon finding a signal of interest.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
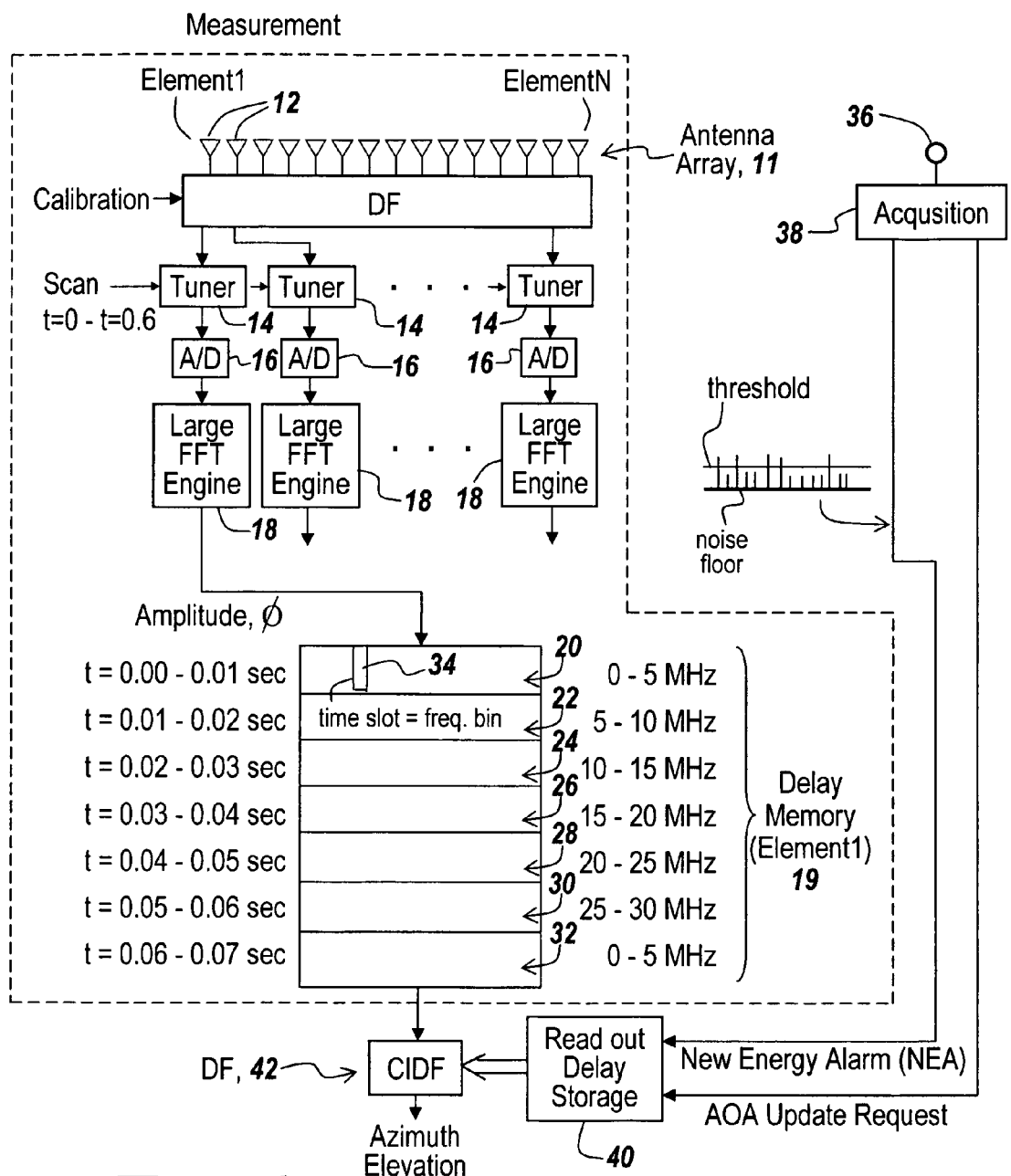
FIG. 1 is a block diagram illustrating the scanning direction finding system in which the measurement function is separated from the direction finding calculation function, illustrating the use of a large FFT engine for each channel to provide a frequency domain conversion for each bin, with angle and phase information carried by each bin being stored in delay memory and outputted for direction finding calculation upon either new energy detection or for some other purpose.

Referring now to FIG. 1, in one embodiment, as part of separating out the processing, a measurement section indicated by dotted line 10 is provided including an antenna array 11 that is coherently sampled by coherently sampling antenna elements 12, with the output of every antenna element being supplied to its own tuner 14 and then to an associated analog-to-digital converter 16, the output of which is directly coupled to a very large Fast Fourier Transform engine 18. The outputs of all of the FFT engines are coupled to delay storage 19, that in turn is segmented into frequency bands as illustrated at 20-32 into which data relating to amplitude and phase is stored in frequency bins, one of which being illustrated at 34.

In one embodiment the Transform is a 16-K transform. With modern computers, one can do very large FFTs in a very short period of time. Very large FFTs can convert large numbers of samples, meaning that one could process very large bandwidths, for instance 5 MHz wide. With a 5-MHz-wide bandwidth, the FFT would be on the order of 8,000, an 8K FFT, which results in a bin size down to about 610 Hz. By using a larger FFT, such as a 16K FFT, for a relatively wide 5 MHz front end, one could obtain an even smaller bin size of 313 Hz.

For a 16K FFT, one obtains 16,384 bins containing amplitude and phase information. Each of the 16,384 bins across 5 MHz provides for ample coverage over the frequency band such that for each 305-Hz bin each one containing the amplitude and a phase value for the sampled time period.

If, for instance, as to the delay storage as shown at 20, one samples from zero to 0.01 seconds, that corresponds to a band from 0 to 5 MHz and stores the FFT output. As shown at 22, if one samples from 0.01 to 0.02 seconds, one would cover the 5- to 10-MHz band, again with the measurements being stored. As shown at 24 and 26, if one samples between 0.02-0.03, or 0.03-0.04 seconds, one would cover 10 to 15 MHz and 15 to 20 MHz. As shown at 28, sampling from 0.04-0.05 seconds, one would cover the 20- to 25-MHz band. As shown at 30, sampling from 0.05-0.06 seconds one would cover the 25- to 30-MHz band. As shown at 32, from 0.06 to 0.07 seconds one revisits the first band.

Thus, for each sampling interval, one can sample a different 5 MHz band, with cycling through the different bands being referred to as scanning.

Having performed the aforementioned scanning, the system performs the very large FFT on the results and stores the data in delay memory 19.

In one method of operation involving new energy alarms, an omni-directional antenna 36 is used to detect new energy arrival by a signal detection module 38 such that for any given instant of time, upon detection of the new energy and its frequency, the frequency bins in delay memory 19 can be read out as illustrated at 40 so as to provide the amplitude and phase data for the associated bin for each antenna element in order to permit a Correlation Interferometer Direction Finding (CIDF) direction finding calculation as illustrated at 42 on the data in that bin set to obtain azimuth and elevation. The process is computationally efficient because one does not have to re-compute any Fast Fourier Transforms because the Fast Fourier Transform has already been done. Thus Fast Fourier Transform has to be performed only once regardless of the number of CIDF calculations for that collection interval.

Upon readout of the delayed memory, one processes the readout information with the traditional CIDF algorithms as shown at 42 to obtain azimuth and elevation for the particular frequency.

Alternatively, since frequency domain information is available and stored continuously, one can read out the delay memory for any signal intelligence purpose regardless of whether the signal is currently on the air.

This means that data is always available to ascertain the number of signals that exist at a given time or to detect low-level signals hiding behind powerful signals. Thus, one can request angle of arrival calculation at any time without having to perform a separate FFT. As shown by AOA update request 42. The net result is that one can DF on thousands of signals per second.

Note that the subject system permits one to make one measurement upon which one can simultaneously direction-find multiple signals or multiple assets, whereas the older systems allowed one to direction-find only on one signal at a time. Thus the subject system has the ability to take one measurement and apply it to multiple signals. Note with the prior systems there was no hope of processing hundreds of signals per second. However, with the subject system, once having stored the results of the large FFT in the delayed memory, one can simultaneously direction-find on as many signals as there are in all of the frequency bins.

The benefits for the subject system are, first and foremost, that one is able to DF on multiple assets, namely multiple signals. One makes one measurement to detect and measure large numbers of signals. This permits processing hundreds or thousands of signals per second.

The next benefit of the subject system is that it decouples the measurement from any new energy alarm. Thus it is no longer necessary to make sure that the signal is still on the air in order to direction-find on it.

Thirdly, because all existing signals are measured, one can go back, read out the data collected and, using standard techniques, find low level signals that are hidden behind higher-power signals or more generally to ascertain the number of signals that exist.

Figure 2:
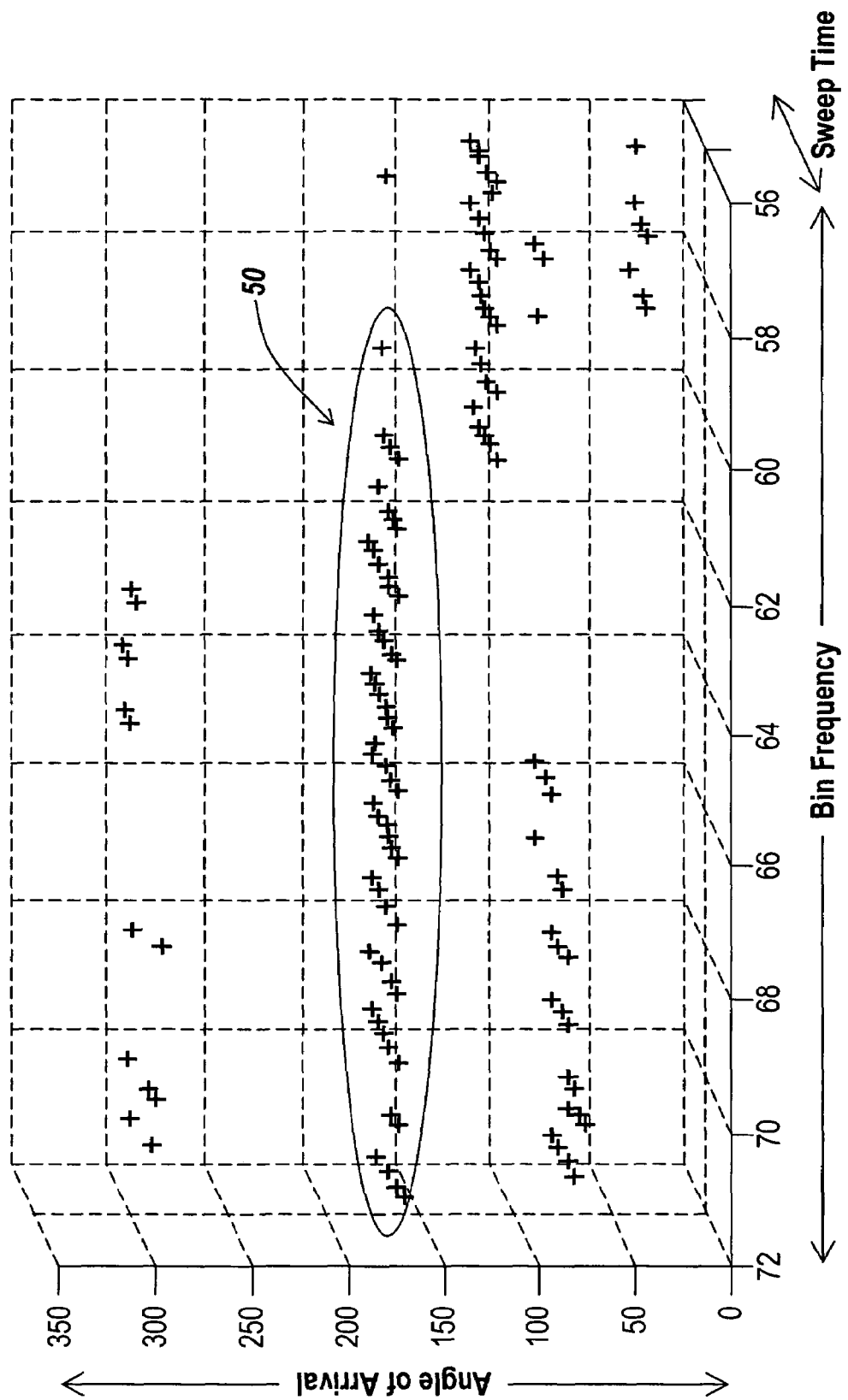
FIG. 2 is a 3D MATLAB plot graphing angle of arrival, versus sweep number, versus frequency to provide display the signal environment.

Referring to FIG. 2, a MATLAB plot is presented of what the output from a scanned DF system might look like. On this plot the Y axis is angle of arrival. What is shown are signals arriving at the indicated angle, here approximately 150°-160° as indicated by circle 50. Each cross indicates a signal that has arrived at the indicated angle. Since the Z axis is the sweep time, the figure represents detected sources by time of receipt and angle of arrival at a certain bearing. Thus the drawing depicts all received signals at a certain bearing.

Note that the X axis represents the bin frequency of the signals that happen to be spanning multiple bins. What is provided is thus a 3D representation that displays the signal environment.

Figure 3:
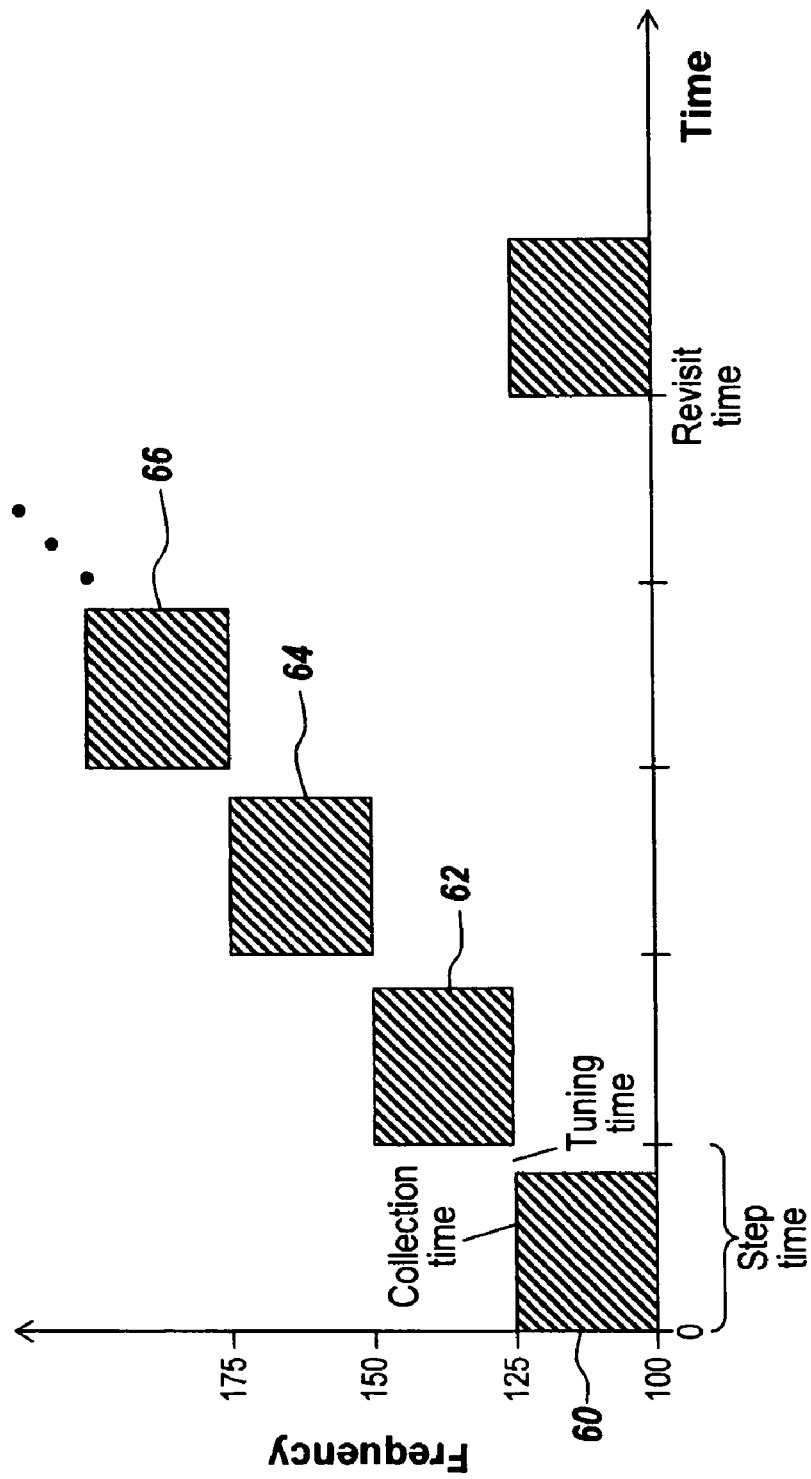
FIG. 3 is a diagrammatic illustration of a method of optimizing collection time over a wide bandwidth so as to maximize collecting energies to facilitate computation of the maximum number of direction finding operations per second, graphing step time versus tuning time.

Referring to FIG. 3, what is depicted is how the collection and tuning time influence total step time; and how the scanning DF receivers would be tuned blocks. As can be seen by block 60, the first block corresponds to a band from 100 to 125; block 62, the second block, a band from 125 to 150, et cetera, with the diagram showing the size of the steps for tuning in each of the consecutive bands in terms of step time versus collection time. These are the actual measurement steps in both frequency and time when using a wideband front end.

Essentially what is shown is that the receivers would be tuned during the zero to the completion of the first collection as the first step, in one embodiment, for the 100 to 125 MHz band. Thus the frequency band is set by the combination of step time and tuning interval.

The graph tells one that one is optimizing collection time in a wideband sense so that one is collecting multiple signals over the scan time period. Note the total scan time is the number of steps times the step time. One optimizes the scan DF approach when the collection time is significantly larger than the tuning time.

What the drawing is pointing out is that, when one forms the final parameters, one does not want to pick a receiver that has a very long tuning time relative to the collection time. If one is going to collect for a millisecond, one does not want a receiver that takes a millisecond to tune. For instance, if the two times are one millisecond by one millisecond, 50% of the time one would be spent tuning. Thus the figure is saying, one should not use a bad receiver. Also, one can pick a cheap receiver if one is going to integrate for a very long period of time.

Clearly it would be desirable to have a receiver that does not take any time to tune. Note that the Y axis relates to the various frequency bands from 100 to 125, 125 to 150, 150 to 175, et cetera.

The other thing to note is that the way one determines the revisit time, one looks at the number of steps 60-66 times the step time. The step time is, of course, made up of the collection interval and the tuning time. And so obviously one wants to pick a receiver that tunes very fast. But one also has to trade the collection time for both signal-to-noise ratio and the bin size that one is looking for.

Figure 4:
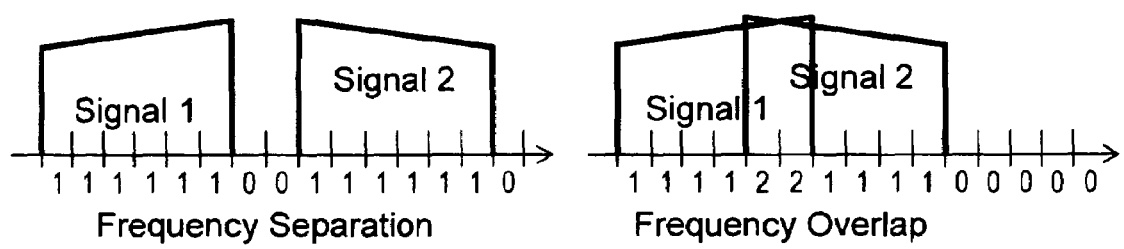
FIG. 4 is a diagrammatic illustration of the ability of the scanning direction finding system to deal with two simultaneous and spatially separated overlapping signal sources first to ascertain the presence of multiple signals that overlap, and secondly to be able to identify a low-level signal hidden behind a high-level signal so it cannot hide; and, FIG. 5 is a diagrammatic illustration showing the possibility of detecting a hidden signal from underneath a powerful, booming signal, for instance transmitted by a commercial FM radio station.

Referring to FIG. 4, this figure shows the ability for the scanning DF system to deal with two particular problems that have always plagued signal intelligence systems. First occurs when two signals are separated spatially. In this case they are easy to deal with. If one sees them both, i.e., along different LOBs, one can tune to the two different stations and DF them both.

But as the emitters move together, they start to overlap, which they have a tendency to do particularly in military communications, but also in all sorts of other applications where the signals have a tendency to collide. That makes a problem that is very hard to deal with from a signal intelligence perspective. The subject scanning DF technique deals well with the overlap situation because what is represented in FIG. 4 is the ability to take each one of these bins represented by the little two vertical lines, i.e., the divisions on the X axis, and apply the Sigma CIDF algorithm to come up and inform one that, in the left-hand case of FIG. 4, one has one signal occupying each frequency bandwidth, with no signals existing in the separation area between the two signals. This is done by noting the number of existing signals based on LOB calculations.

In the right-hand case where the signals are overlapping, this fact can also be detected by the subject system. This can also be seen by the number of signals that exist. In the outer areas there is only one signal; but in the overlap area there are two signals. One can tell, using Sigma and CI DF techniques the number of signals, and the scanning DF technique, which stores measured data, that one has an overlap problem, whereas other systems would have had to identify the overlap as an anti-A area. The prior systems might not do so because if Signal 1 is on the air and then Signal 2 came up, one might not detect this fact. If one is DFing, one can tell that one has two signals, and focus a different asset to process Signal 2. Thus, having all the data in storage, one can DF all signals that have been previously stored; and if two LOBs result, one has two overlapping signals.

Algorithms to separate overlapping signals exist, but until the present invention there was no ability to automatically detect overlapping signals.

In other words, one can envision a system where one has the processing power downstream where one is not even looking for detections. One can elect to calculate LOB on every single new energy source because one has the CPU power to do it. If one is defining LOBs on all NEAs, it is possible as one goes through all the bins every time, to know how many signals are there and identify when two signals overlap because all the measurements have been previously made.

Figure 5:
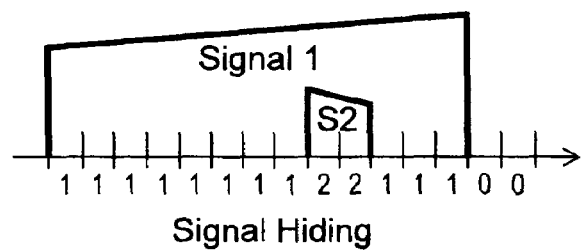

As to FIG. 5, the subject system also addresses a particularly insidious problem because one of the favorite techniques of various people is to hide behind big signals. What is shown in FIG. 5 is Signal 1 from a big TV station or a radio station or something that is always on. The signal of interest, Signal 2, is much reduced in amplitude when compared with the amplitude of Signal 1. The small Signal 2 is hiding behind Signal 1 and comes up at very low power. But because the transmitter of Signal 2 knows where he is and the person he's communicating with knows where he is, the two are able to talk even in the face of the big interferer, Signal 1.

For one to know that there is a hidden signal represents a problem. But if one uses the subject invention and calculates DFs for each bin, one can automatically know when the small signal comes up by analyzing the stored data.

There are communication techniques that allow one to work in the presence of a big signal. If the hidden signal is a smaller bandwidth signal and the person who is listening to the hidden signal is matched to the hidden signal format using some sort of matched filtering where one knows that the hidden signal is going to come up in two particular bins, if one is tuned right to those two bins, one need not pay attention to either a directional antenna or other mechanisms to not hear the big signal.

However, for signal intelligence purposes one does not know if there is a hidden signal. One would not know of the existence of the hidden signal unless one were actually doing the sigma CIDF on the small signal to start out with. Since the system has already done all of the FFTs on all of the signals, one has all of the values ready to throw into an efficient computational model. The data being processed is done at a great rate. Thus all of the FM stereo band can be processed, so that one would see the hidden signal, having seen it by the DFing. Without the rapid DFing due to the already-collected and stored data, the hidden signal would not be detected.

Note, if one knows of its existence, one can discriminate the hiding signal. This is because the hidden signal usually has a much narrower bandwidth. Because of the narrow frequency bins one can detect the narrow bandwidth hidden signal.

Basically, if one knew the hidden signal was there anyway, one could apply the appropriate algorithm and DF the small signal. The subject system allows one the opportunity to know of the existence of the hidden signal, because one has collected all this information ahead of time and has converted it to the frequency domain. Given that one has the processing resources, one simply computes LOBs on every bin.

One of the things that pops out of the algorithm is that there are two signals that one was not set up to go chase previously. Now one is set up in a way that one can chase the hidden signal without additional effort.

One knows of the hidden signal because one looked at the output of all of these bins.

Note one does not have an NEA, since one is processing every conceivable signal in the corresponding bandwidth. One can just compute the LOB as a matter of routine, with the LOBs indicating that there is a hidden emitter, i.e., more than one existing signal, or one can compute the LOB once knowing that there is a hidden signal to know that the signaler is hiding and where he is hiding.

This assumes, of course, that there is some spatial separation between the boomer and the emitter of the hidden signal. However, even if they are on the same bearing, provided that they are not coherent, one can tell that there are two signals on the same bearing. Typically the signals are not coherent if from different transmitters.

Basically, the subject system will enable one to at least be able to tell how many signals are coming from two different bearings. The key part of that is not the algorithm but that the measurement now facilitates using prior algorithms for finding hidden sources in an operationally effective manner.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for being able to direction-find on a large number of incoming RF signals per second to reliably identify and provide the azimuth and elevation thereof, comprising the steps of:

measuring the incoming RF signals by reading out a coherently sampled antenna array of more than two elements in a parallel fashion using parallel-connected RF receivers including tuners tuned to different pre-selected bands;

scanning the entire RF spectrum of interest by sequentially reading out the parallel-connected RF receivers to condition the signals in the analog domain by the pre-selecting of the bands to which the tuners and thus the receivers are tuned so as to obtain band filtered analog time domain data with increased RF selectivity;

converting the analog time domain data from the scan to digital data in an analog-to-digital conversion step;

performing a Fast Fourier Transform on the analog-to-digitally-converted data;

storing the results of the Fast Fourier Transformed data in a frequency bin of a delay memory; and, accessing selected frequency bins of the delay memory to extract amplitude and phase information relating to a frequency of interest;

direction finding on the extracted information, whereby the measuring function is separated from the direction-finding function, thus to increase the number of signals per second on which one can direction-find.

2. The method of claim 1, and further including the steps of generating a new energy alarm signal upon the presence of an incoming signal exceeding a predetermined threshold;

ascertaining the frequency of the incoming signal resulting in the new energy alarm; and, reading out the associated frequency bin of the delay memory for direction finding processing, whereby the direction finding function is only performed when a signal of interest is indicated by alternate systems processing the new energy alarm and does so on already-generated data.

3. The method of claim 1, and further including the step of utilizing the contents of the delay memory to ascertain the presence of multiple signals by performing a direction finding operation on the stored data, whereby, having measured data from all signals received by the array, one can ascertain the presence of multiple signals from angle of arrival measurements performed by the direction finding.

4. The method of claim 3, and further including the step of ascertaining the number of incoming signals present by virtue of different angles of arrival determined during direction finding.

5. The method of claim 4, and further including the step of ascertaining the presence of a weak signal hidden behind a strong signal based on differences of angles of arrival previously computed during direction finding.

6. The method of claim 1, wherein the direction finding step includes the use of a Correlation Interferometer Direction Finding (CIDF) algorithm to obtain azimuth and elevation.

7. The method of claim 1, wherein the Fast Fourier Transform step uses a large Fast Fourier Transform to provide a large number of data points corresponding to a large number of frequency bins so that within a given band the number of frequency bins can be increased over that associated with small Fast Fourier Transforms.

8. The method of claim 7, wherein the large Fast Fourier Transform is an 8K transform.

9. The method of claim 8, wherein each of the bands has a 5 MHz bandwidth and wherein the frequency bins are on the order of 610 Hz.

10. The method of claim 8, wherein the frequency bands have a 5 MHz bandwidth and wherein the Fast Fourier Transform is a 16K Fast Fourier Transform such that the bin size is on the order of 305 Hz.

11. The method of claim 1, wherein the Fast Fourier Transform is sufficiently large to be able to direction-find on 100 signals per second.

12. The method of claim 1, wherein the Fast Fourier Transform is sufficiently large to be able to direction-find on in excess of 1,000 signals per second.

13. A method for rapidly direction-finding on a large number of incoming signals per second detected at a coherent antenna array, comprising the steps of:

providing a wideband receiver having parallel RF tuners pre-set to different bands and coupled to an array having more than two elements, the tuners being coupled to the array elements in parallel;

scanning the receiver over a number of frequency bands to provide analog receiver signals having increased RF selectivity due to the breakup of the frequencies monitored into a plurality of bands, the scanning including sequentially accessing the outputs of said tuners, whereby the scanning may be rapid due to the fact that the tuners are reading out the array elements in parallel;

converting the analog receiver signals to digital signals;

performing a Fast Fourier Transform on all of the digital signals;

storing the results of the Fast Fourier Transform process in a delay memory; and, direction-finding only on signals of interest through accessing selected portions of the delay memory.

14. The method of claim 13, wherein the scan time for the receiver is set such as to be able to revisit all frequencies within all selected bands such that the system measures all signals arriving at the receiver, with the delay memory relaxing any requirement that signals be up in order to be able to do a direction finding operation.

15. The method of claim 14, and further including the steps of direction finding only on signals that trigger a new energy alarm, whereby the number of new energy signals for which azimuth and elevation can be ascertained is not limited by having to perform an additional Fast Fourier Transform operation.

16. Apparatus for rapidly detecting the azimuth and elevation of a number of incoming signals such that the presence and location of the emitter of an incoming signal is not lost due to processing, comprising:

an antenna array having more than two elements;

a scanning direction finding receiver having a plurality of tuners coupled in parallel to different elements of said antenna array for the simultaneous detection of energy at the array elements, with the tuners pre-tuned to different pre-selected bands;

analog-to-digital converters coupled to the output of said tuners to convert time domain information from each of the antenna elements into frequency domain information;

a Fast Fourier Transform engine for each analog-to-digital converter for processing the output of an associated analog-to-digital converter corresponding to the output of a corresponding tuner coupled to an associated antenna array element for generating a number of Fast Fourier Transform signals corresponding in number to the number of antenna elements;

a delay memory for storing the results of performing the Fast Fourier Transform; and, a direction finding processor for ascertaining azimuth and elevation for signals of interest by accessing portions of the data stored in said delay memory.

17. The apparatus of claim 16, wherein said Fast Fourier Transform is a large Fast Fourier Transform.

18. The apparatus of claim 17, wherein said large Fast Fourier Transform is an 8K transform.

19. The apparatus of claim 17, wherein said large Fast Fourier Transform is a 16K transform.

20. The apparatus of claim 16, and further including a new energy alarm for providing a signal indication of the frequency of the new energy when an incoming signal is above a predetermined threshold, and means for reading out said delay memory at the frequency of the delayed memory frequency bin corresponding to the frequency of the signal causing the new energy alarm such that amplitude and phase information in said frequency bin are used by said direction finding processor to calculate azimuth and elevation of said new energy alarm signal.

21. A method for being able to direction-find on a large number of incoming signals per second to reliably identify and provide the azimuth and elevation thereof, comprising the steps of:

measuring the incoming signals by scanning the entire spectrum of interest with sequentially-tuning receivers coupled to the elements of a coherently sampled antenna array, the receivers tuned to predetermined bands so as to obtain analog time domain data;

converting the analog time domain data from the scan to digital data in an analog-to-digital conversion step;

performing a Fast Fourier Transform on the analog-to-digitally-converted data;

storing the results of the Fast Fourier Transformed data in a frequency bin of a delay memory;

accessing selected frequency bins of the delay memory to extract amplitude and phase information relating to a frequency of interest;

direction finding on the extracted information, whereby the measuring function is separated from the direction-finding function, thus to increase the number of signals per second on which one can direction-find;

generating a new energy alarm signal upon the presence of an incoming signal exceeding a predetermined threshold;

ascertaining the frequency of the incoming signal resulting in the new energy alarm; and, reading out the associated frequency bin of the delay memory for direction finding processing, whereby the direction finding function is only performed when a signal of interest is indicated by alternate systems processing the new energy alarm and does so on already-generated data.

22. Apparatus for rapidly detecting the azimuth and elevation of a number of incoming signals such that the presence and location of the emitter of an incoming signal is not lost due to processing, comprising:

an antenna array having a number of elements;

a scanning direction finding receiver having tuners respectively coupled to different elements of said antenna array;

analog-to-digital converters coupled to the output of said tuners to convert time domain information from each of the antenna elements into frequency domain information;

a Fast Fourier Transform engine for each analog-to-digital converter for processing the output of an associated analog-to-digital converter corresponding to the output of a corresponding tuner coupled to an associated antenna array element for generating a number of Fast Fourier Transform signals corresponding in number to the number of antenna elements;

a delay memory for storing the results of performing the Fast Fourier Transform;

a direction finding processor for ascertaining azimuth and elevation for signals of interest by accessing portions of the data stored in said delay memory;

a new energy alarm for providing a signal indication of the frequency of the new energy when an incoming signal is above a predetermined threshold; and means for reading out said delay memory at the frequency of the delayed memory frequency bin corresponding to the frequency of the signal causing the new energy alarm such that amplitude and phase information in said frequency bin are used by said direction finding processor to calculate azimuth and elevation of said new energy alarm signal.

\* \* \* \* \*